(12) United States Patent
Chun et al.

(10) Patent No.: US 8,465,599 B2
(45) Date of Patent: Jun. 18, 2013

(54) CHROMIUN-ENRICHED OXIDE CONTAINING MATERIAL AND PREOXIDATION METHOD OF MAKING THE SAME TO MITIGATE CORROSION AND FOULING ASSOCIATED WITH HEAT TRANSFER COMPONENTS

(75) Inventors: ChangMin Chun, BelleMead, NJ (US); Mark A. Greaney, Upper Black Eddy, PA (US); Thomas Bruno, Raritan, NJ (US); Ian A. Cody, Adelaide (AU); Trikur A. Ramanarayanan, Somerset, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 164 days.

(21) Appl. No.: 13/193,223

(22) Filed: Jul. 28, 2011

(65) Prior Publication Data

US 2011/0277888 A1   Nov. 17, 2011

Related U.S. Application Data

(62) Division of application No. 11/641,750, filed on Dec. 20, 2006, now Pat. No. 8,037,928.

(60) Provisional application No. 60/751,985, filed on Dec. 21, 2005, provisional application No. 60/815,844, filed on Jun. 23, 2006, provisional application No. 60/872,493, filed on Dec. 4, 2006.

(51) Int. Cl.
*C23C 8/14*   (2006.01)

(52) U.S. Cl.
USPC ........... 148/287; 148/276; 148/277; 148/284; 148/286; 165/133; 165/134.1

(58) Field of Classification Search
USPC .......... 148/276, 277, 284, 286–287; 165/133, 165/134.1
See application file for complete search history.

(56) References Cited

U.S. PATENT DOCUMENTS

| 1,773,199 A | 8/1930 | Price |
| 2,872,724 A | 2/1959 | Conant |

(Continued)

FOREIGN PATENT DOCUMENTS

| DE | 10318528 A1 | 11/2004 |
| EP | 0022349 A | 1/1981 |

(Continued)

OTHER PUBLICATIONS

J. Kruger, Passivity, Uhlig's Corrosion Handbook, Second Edition, 2000, pp. 165-171.

(Continued)

*Primary Examiner* — Lois Zheng
(74) *Attorney, Agent, or Firm* — Glenn T. Barrett

(57) ABSTRACT

A method of providing sulfidation corrosion resistance and corrosion induced fouling resistance for a heat transfer component is disclosed. The heat transfer component includes a heat exchange surface formed from a chromium-enriched oxide containing material formed from the composition $\delta$, $\epsilon$, and $\zeta$, wherein $\zeta$ is a steel containing at least about 5 to about 40 wt. % chromium, $\epsilon$ is a chromium enriched oxide ($M_3O_4$ or $M_2O_3$ or mixtures thereof) formed on the surface of the steel $\zeta$, wherein M is a metal containing at least 5 wt. % Cr based on the total weight of the metal M, and $\delta$ is a top layer formed on the surface of the chromium-enriched oxide $\epsilon$, comprising sulfide, oxide, oxysulfide, and mixtures thereof. The top layer $\delta$ comprises iron sulfide ($Fe_{1-x}S$), iron oxide ($Fe_3O_4$), iron oxysulfide, iron-chromium sulfide, iron-chromium oxide, iron-chromium oxysulfide, and mixtures thereof. The metal M of the chromium enriched oxide ($M_3O_4$ or $M_2O_3$ or mixtures thereof) may comprise Fe, Cr, and constituting elements of the steel $\zeta$. The steel $\zeta$ may be selected from low chromium steels, ferritic stainless steels, martensitic stainless steels, austenitic stainless steels, duplex stainless steels and precipitation-hardenable alloys.

10 Claims, 7 Drawing Sheets

U.S. PATENT DOCUMENTS

| | | | |
|---|---|---|---|
| 3,835,817 | A | 9/1974 | Tuomaala |
| 4,162,617 | A | 7/1979 | Schmidt et al. |
| 4,168,184 | A | 9/1979 | Hultquist et al. |
| 4,230,507 | A | 10/1980 | Obayashi et al. |
| 4,419,144 | A | 12/1983 | Apblett, Jr. et al. |
| 4,505,017 | A | 3/1985 | Schukei |
| 4,596,611 | A | 6/1986 | Dawes et al. |
| 4,881,983 | A | 11/1989 | Smith et al. |
| 4,891,190 | A | 1/1990 | Carter et al. |
| 5,259,935 | A | 11/1993 | Davidson et al. |
| 5,396,039 | A | 3/1995 | Chevrel et al. |
| 5,540,275 | A | 7/1996 | Eisinger |
| 5,714,015 | A | 2/1998 | Lentz |
| 5,873,408 | A | 2/1999 | Bellet et al. |
| 5,942,184 | A | 8/1999 | Azuma et al. |
| 5,951,787 | A | 9/1999 | Ohmi et al. |
| 5,985,428 | A | 11/1999 | Chiba |
| 6,156,440 | A | 12/2000 | Suwa et al. |
| 6,174,610 | B1 | 1/2001 | Ohmi |
| 6,479,013 | B1 | 11/2002 | Sera et al. |
| 6,648,988 | B2 | 11/2003 | Ramanarayanan et al. |
| 6,692,838 | B2 | 2/2004 | Ramanarayanan et al. |
| 6,824,883 | B1 | 11/2004 | Benum et al. |
| 6,848,642 | B2 | 2/2005 | Hitomi |
| 6,856,665 | B2 | 2/2005 | Hemmi et al. |
| 6,878,932 | B1 | 4/2005 | Kroska |
| 2001/0018962 | A1 | 9/2001 | Joshi et al. |
| 2001/0027867 | A1 | 10/2001 | Gandy et al. |
| 2002/0155306 | A1 | 10/2002 | Anada et al. |
| 2004/0119038 | A1 | 6/2004 | Crockett et al. |
| 2005/0016828 | A1 | 1/2005 | Bednarek et al. |
| 2005/0045251 | A1 | 3/2005 | Nishiyama et al. |
| 2005/0200354 | A1 | 9/2005 | Edwin et al. |
| 2006/0124472 | A1 | 6/2006 | Rokicki |
| 2006/0150358 | A1 | 7/2006 | Bongiovanni |

FOREIGN PATENT DOCUMENTS

| | | |
|---|---|---|
| EP | 0596121 A1 | 5/1992 |
| EP | 0716282 A | 6/1996 |
| EP | 0780656 A | 6/1997 |
| FR | 2795337 A1 | 12/2000 |
| FR | 2795748 A | 1/2001 |
| GB | 435870 A | 9/1936 |
| GB | 532144 A | 1/1941 |
| GB | 846994 | 9/1960 |
| GB | 1099742 A | 1/1968 |
| GB | 2147078 A | 5/1985 |
| GB | 2152204 A | 7/1985 |
| GP | 1247429 A | 9/1971 |
| JP | 58207375 A | 12/1983 |
| JP | 60023794 | 2/1985 |
| JP | 62017169 A | 1/1987 |
| WO | 9816792 A | 4/1998 |
| WO | 0045965 A | 8/2000 |
| WO | 0208498 A | 1/2002 |
| WO | 2004108970 A2 | 12/2004 |
| WO | 2006076161 A1 | 7/2006 |

OTHER PUBLICATIONS

International Search Report, PCT Application No. PCT/US2006/048359, Nov. 13, 2007.

Written Opinion, PCT Application No. PCT/US2006/048359, Nov. 13, 2007.

International Search Report, PCT/US2007/011828, mailed Dec. 21, 2007.

CHROMIUN-ENRICHED OXIDE CONTAINING MATERIAL AND PREOXIDATION METHOD OF MAKING THE SAME TO MITIGATE CORROSION AND FOULING ASSOCIATED WITH HEAT TRANSFER COMPONENTS

CROSS REFERENCE TO RELATED APPLICATION

This application is a divisional of U.S. patent application Ser. No. 11/641,750, now U.S. Pat. No. 8,037,928 filed on Dec. 20, 2006, which relates and claims priority to U.S. Provisional Patent Application No. 60/751,985, filed Dec. 21, 2005, entitled "Corrosion Resistant Material For Reduced Fouling, A Heat Exchanger Having Reduced Fouling And A Method For Reducing Heat Exchanger Fouling in a Refinery" and U.S. Provisional Patent Application No. 60/815,844, filed Jun. 23, 2006 entitled "A Method of Reducing Heat Exchanger Fouling in a Refinery" and U.S. Provisional Patent Application No. 60/872,493, filed Dec. 4, 2006 entitled "An Insert and Method For Reducing Fouling In A Process Stream."

FIELD OF THE INVENTION

This invention relates to the reduction of sulfidation or sulfidic corrosion and the reduction of depositional fouling in general and in particular the reduction of sulifidation/sulfidic corrosion and the reduction of depositional fouling in heat transfer components, which include but are not limited to heat exchangers, furnaces and furnace tubes located in refining facilities and petrochemical processing facilities and other components used for transporting or conveying process streams, which may be prone to fouling. In particular, the present invention relates to the reduction of corrosion and fouling associated with process streams. The present invention is directed to a chromium-enriched oxide for use in the reduction of corrosion and fouling in heat transfer components. The present invention is directed to a method of reducing fouling in a heat transfer component, which combines the use of a corrosion resistant material having the desired surface roughness with the application of vibration, pulsation and internal turbulence promoters.

BACKGROUND OF THE INVENTION

Heat transfer components are used in refinery and petrochemical processing applications at various locations within the facilities to adjust the temperature (i.e., heat or cool) of the processed fluid (e.g., crude oil or derivatives thereof). The heat transfer components (e.g., a heat exchanger, furnaces, and furnace tubes) may be near the furnace to pre-heat the temperature of the oil prior to entry into the furnace (i.e., late-train). A typical tube-in-shell heat exchanger includes a plurality of tubes through which the oil may flow through and around. A hot fluid and a cold fluid enter separate chambers or tubes of the heat exchanger unit. The hot fluid transfers its heat to the cold fluid. The heat exchanger is designed to efficiently transfer heat from one fluid to another. The hot and cold fluids are never combined. Heat transfer occurs through the tube wall that separates the hot and cold liquids. By employing the correct flow rate and maximizing the area of the partition, heat exchanger performance can be optimally controlled. A variety of other heat exchanger designs, such as spiral heat exchangers, tube-in-tube heat exchangers and plate-and-frame heat exchangers operate essentially on the same principles.

During normal use with contact between the oil and the heat exchanger, corrosion and the build-up of deposits occurs. This build-up of deposits is often called fouling. Fouling adversely impacts the optimal control of the heat exchanger. Fouling in this context is the unwanted deposition of solids on the surfaces of the tubes of the heat exchanger, which leads to a loss in efficiency of the heat exchanger. Fouling is not limited to heat exchangers. Fouling may occur in other heat transfer components and transfer components for transferring process fluids. The loss in heat transfer efficiency results in higher fuel consumption at the furnace and reduced throughput. The buildup of foulants in fluid transfer components results in reduced throughput, higher loads on pumping devices and plugging of downstream equipment as large pieces of foulant periodically dislodge and flow downstream. As a result of fouling, the transfer components and heat transfer components must be periodically removed from service to be cleaned. This decreases overall facility reliability due to shutdowns for maintenance. This also leads to increased manpower requirements due to the number of cleaning crews required to service fouled heat exchanger and process fluid transfer tubes. Another detriment is an increase in volatile organic emission resulting from the cleaning process.

During normal use, the surfaces of the tubes of the heat exchanger are subject to corrosion as a result of the prolonged exposure to the stream of crude and other petroleum fractions. Corrosion on the surfaces of the tubes creates an uneven surface that can enhance fouling because the various particles found in the petroleum stream may attach themselves to the roughened surface. Fouling is not limited solely to the crude oils being processed. The vacuum residual streams are often used to heat the crude within the tubes. These streams often contain solids and are high fouling. Fouling can be associated with other process streams including but not limited to air. Fouling can be associated with other process streams including but not limited to process gases (e.g., air and steam).

While the problems of fouling extend beyond petroleum refining and petrochemical processing, the presence of crude oil presents numerous obstacles in preventing fouling that are unique to petroleum refining and petrochemical processing not present in other industries. Crude oil, in the context of fouling, is in reality more than simply a petroleum product produced from an underground reservoir. Crude oil is a complex mixture of organic and inorganic components which may result in a variety of foulant deposits on the surfaces of the heat exchanger including but not limited to both surfaces of the heat exchanger tubes, the baffles and the tube sheets. For example, crude oil as it is received at the refinery often contains corrosion byproducts such as iron sulfide, which are formed by the corrosion of drilling tubulars, pipelines, tanker holds and crude storage tanks. This material, under the right conditions, will deposit within heat exchangers resulting in depositional fouling. Crude oils often contain aqueous contaminants, some of which arrive at the refinery. Desalting is used to remove most of this material, but some of these contaminants pass through the desalter into the crude preheat train. These dissolved salts can also contribute to depositional fouling. Sodium chloride and various carbonate salts are typical of this type of foulant deposit. As more and more chemicals are used to enhance production of crude from old reservoirs, additional inorganic materials are coming to the refineries in the crude oil and potentially contributing to fouling.

Crude oils are typically blended at the refinery, and the mixing of certain types of crudes can lead to another type of foulant material. The asphaltenic material that is precipitated by blending of incompatible crudes will often lead to a predominantly organic type of fouling, which with prolonged heating, will form a carbonaceous or coke-like foulant deposit. Crude oils often also contain acidic components that directly corrode the heat exchanger materials as well. Naphthenic acids will remove metal from the surface and sulfidic components will cause sulfidic corrosion which forms iron sulfide. This sulfidic scale that is formed is often referred to as sulfide induced fouling.

Synthetic crudes are derived from processing of bitumens, shale, tar sands or extra heavy oils and are also processed in refinery operations. These synthetic crudes present additional fouling problems, as these materials are too heavy and contaminant laden for the typical refinery to process. The materials are often pre-treated at the production site and then shipped to refineries as synthetic crudes. These crudes may contain fine particulate silicaceous inorganic matter, such as in the case of tar sands. Some may also contain reactive olefinic materials that are prone to forming polymeric foulant deposits within heat exchangers. As can be understood from this discussion, crude oils are complex mixtures capable of forming a wide-range of foulant deposit types.

Currently, there are various techniques available for reducing fouling in refinery operations. One technique is avoiding the purchase of high-fouling crudes or corrosive crudes. This, however, reduces the pool of feedstock that is potentially available to the refinery. Additionally, the crude oil can be tested to determine whether or not the crude oil is compatible with the refinery. Again, this can reduce the feedstock potentially available to the refinery. Anti-foulant agents may also be added to the refinery stream. While these techniques are useful in reducing the rate of fouling within the heat transfer components, fouling may still occur under certain circumstances. The heat exchangers must still be routinely removed from service for cleaning to remove the build-up of contaminants. Furnace tubes must be taken off-line and steam-air decoked or pigged because of foulant deposition. Other alternative cleaning methods include the use of mechanical devices (e.g., "SPIRELF" and "brush and basket" devices). These devices, however, have low reliability and high maintenance needs.

There is a need to significantly reduce fouling in heat transfer components in refinery and petrochemical processing operations that does not encounter the drawbacks associated with the current techniques.

SUMMARY OF THE INVENTION

It is an aspect of the present invention to provide a heat transfer component that is resistant to fouling. The heat transfer component is used to either raise or lower the temperature of a process fluid or stream. The process fluid or stream is preferably crude oil based and is processed in a refinery or petrochemical facility. The preset invention, however, is not intended to be limited solely to the use of crude oils, other process streams are considered to be well within the scope of the present invention. The heat transfer component may be a heat exchanger, a furnace, furnace tubes or any other component within a refinery or petrochemical facility that is capable of transferring heat from one medium to another which is also susceptible to fouling including but not limited to Crude Preheat, Coker preheat, FCC slurry bottoms, debutanizer exchanger/tower, other feed/effluent exchangers and furnace air preheaters in refinery facilities and flare compressor components and steam cracker/reformer tubes in petrochemical facilities. The heat transfer component contains at least one heat transfer element. It is contemplated that the heat transfer component is a heat exchanger for heating crude oil in a refinery stream prior to the crude entering a furnace, whereby the heat exchanger is resistant to fouling. The heat exchanger may be a tube-in-shell type heat exchanger having a tube bundle located within a housing. The present invention is not intended to be limited to tube-in-shell exchangers; rather, the present invention has application within other exchangers which are prone to fouling when subject to petroleum and/or vacuum residual streams. The tube-in-shell exchanger includes a housing having a wall forming a hollow interior. The wall has an inner surface that is adjacent the hollow interior. The heat transfer element may be a tube bundle located within hollow interior of the housing. The crude oil is heated within the hollow interior of the heat exchanger housing as the crude oil flows over the tube bundle. The tube bundle preferably includes a plurality of heat exchanger tubes.

In accordance with the present invention, each heat exchanger tube may be formed from an aluminum or aluminum alloy coated carbon steel or a steel composition that is resistant to sulfidation or sulfidic corrosion and fouling. The use of aluminum or aluminum alloy coated carbon steel or a steel composition that is resistant to sulfidation and fouling significantly reduces fouling and corrosion, which produces numerous benefits including an increase in heating efficiency, a reduction in the over amount of energy needed to heat the crude oil, an increase in refinery throughput and a significant reduction in refinery downtime.

To further reduce and/or limit fouling, the heat transfer component may be subject to a vibrational force, which results in the development of a shear motion in the liquid flowing within the heat exchanger. This shear motion or turbulent flow within the heat transfer component limits the formation of any foulant on the surfaces of the component by reducing the viscous boundary layer adjacent the walls of the heat transfer element. Alternatively, the fluid flowing through the heat transfer component may be pulsed to reduce the viscous boundary layer.

It is preferable that at least one of the interior surface of the wall of the heat transfer component and the inner and/or outer surfaces of the plurality of heat exchanger tubes is formed in accordance with this invention to have a surface roughness of less than 40 micro inches (1.1 μm). Preferably, the surface roughness is less than 20 micro inches (0.5 μm). More preferably, the surface roughness is less than 10 micro inches (0.25 μm). It is contemplated that both the inner and outer surfaces of the plurality of heat exchanger tubes may have the above-mentioned surface roughness. Such a surface roughness significantly reduces fouling. The smooth surface within the inner diameter of the tubes reduces fouling of the petroleum stream flowing through the tubes. The smooth surfaces on the outer diameter of the tubes and on the inner surface of the housing will reduce fouling of the vacuum residual stream within the housing. It is also contemplated that the surfaces of the baffles located within the heat exchanger and the surfaces of the tube sheets, which secure the tubes in place may also have the above-mentioned surface roughness. Such a surface roughness would significantly reduce fouling on these components.

It is an aspect of the present invention to provide a heat transfer component that is resistant to corrosion and fouling. The heat transfer component includes a heat exchange surface formed from a chromium-enriched oxide containing material formed from the composition $\delta$, $\epsilon$, and $\zeta$, wherein $\zeta$ is a steel containing at least about 5 to about 40 wt. % chromium, ε is a chromium enriched oxide ($M_3O_4$ or $M_2O_3$ or mixtures thereof) formed on the surface of the steel ζ, wherein M is a metal containing at least 5 wt. % Cr based on the total weight of the metal M, and δ is a top layer formed on the surface of the chromium-enriched oxide ε, comprising sulfide, oxide, oxysulfide, and mixtures thereof. In accordance with an aspect of the present invention, it is preferable that the top layer δ comprises iron sulfide ($Fe_{1-x}S$), iron oxide ($Fe_3O_4$), iron oxysulfide, iron-chromium sulfide, iron-chromium oxide, iron-chromium oxysulfide, and mixtures thereof. It is preferable that the metal M of the chromium enriched oxide ($M_3O_4$ or $M_2O_3$ or mixtures thereof) may comprise Fe, Cr, and constituting elements of the steel ζ. The steel ζ may be selected from low chromium steels, ferritic stainless steels, martensitic stainless steels, austenitic stainless steels, duplex stainless steels and precipitation-hardenable alloys.

The present invention is also directed to a method of providing sulfidation corrosion resistance and corrosion induced fouling resistance to a heat transfer component surface. The method includes providing a steel surface containing at least about 5 to about 40 wt. % chromium. A chromium-enriched oxide ($M_3O_4$ or $M_2O_3$ or mixtures thereof) is formed on the surface of the steel, wherein M is a metal containing at least 5 wt. % Cr based on the total weight of the metal M. A top layer is formed on the surface of the chromium-enriched oxide, comprising sulfide, oxide, oxysulfide, and mixtures thereof.

The chromium enriched oxide ($M_3O_4$ or $M_2O_3$ or mixtures thereof) may be formed on the surface of the steel by exposing the steel to a low oxygen partial pressure environment at a temperature of from about 300° C. to 1100° C. for a time sufficient to effect the formation of a chromium enriched oxide ($M_3O_4$ or $M_2O_3$ or mixtures thereof) on the surface of said a steel. The time sufficient to effect the formation of the chromium enriched oxide ($M_3O_4$ or $M_2O_3$ or mixtures thereof) on the surface of the steel may range from 1 min to 100 hrs. The low oxygen partial pressure environment is formed from gases selected from the group consisting $CO_2$, CO, $CH_4$, $NH_3$, $H_2O$, $H_2$, $N_2$, Ar, He and mixtures thereof. The low oxygen partial pressure environment may be a gas mixture of $CO_2$ and CO. The low oxygen partial pressure environment may be a gas mixture of $H_2O$ and $H_2$. The low oxygen partial pressure environment may be pure hydrogen or argon having the dew point of the atmosphere is less than −40° C. The method further include imparting a vibrational force to the heat transfer component surface or feeding a fluid adjacent to the heat transfer component surface and imparting a pulsed force to the fluid.

It is another aspect of the present invention to provide a corrosion resistant barrier layer on a heat transfer component with the application of vibration, pulsation or other internal turbulence promoters.

BRIEF DESCRIPTION OF THE DRAWINGS

The invention will now be described in connection with the following drawings in which like reference numerals designate like elements and wherein.

DETAILED DESCRIPTION OF PREFERRED EMBODIMENTS

Figure 1:
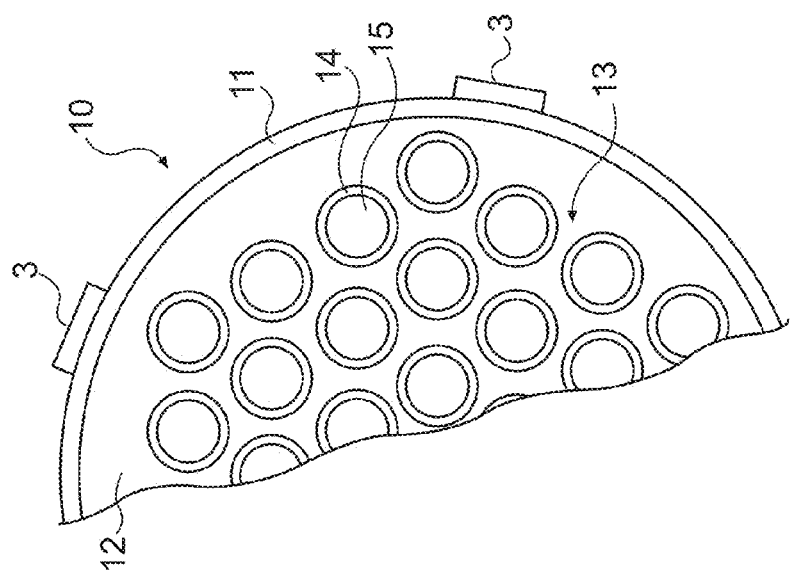
FIG. 1 is an example of heat exchanger having a plurality of heat exchanger tubes for use in a refinery operation.

The present invention will now be described in greater detail in connection with the attached figures. FIG. 1 is a tube-in-shell heat exchanger 10, which is located upstream from a furnace (not shown) and employs the principles of the present invention. The tube-in-shell heat exchanger 10 disclosed herein illustrates one application of the present invention to reduce sulfidation or sulfidic corrosion and depositional fouling in refinery and petrochemical applications. The tube-in-shell exchanger 10 is just one heat transfer component falling under the scope of the corrosion reduction and fouling mitigation measures in accordance with the present invention. The principles of the present invention are intended to be used in other heat exchangers including but not limited to spiral heat exchangers, tube-in-tube heat exchangers and plate-and-frame heat exchangers having at least one heat transfer element. The principles of the present invention are intended to be employed in other heat transfer components including furnaces, furnace tubes and other heat transfer components which may be prone to petroleum and/or vacuum residual fouling. The heat exchanger 10 is used to pre-heat crude oil in a refinery operation prior to entry into the furnace. The heat exchanger 10 includes a housing or shell 11, which surrounds and forms a hollow interior 12. A bundle 13 of heat exchanger tubes 14 is located within the hollow interior 12, as shown in FIG. 1. The bundle 13 includes a plurality of tubes 14. The tubes 14 may be arranged in a triangular configuration or a rectangular configuration. Other tube arrangements are contemplated and considered to be well within the scope of the present invention. Each tube 14 has a generally hollow interior 15 such that the crude oil to be heated flows therethrough. The heating or warming fluid (e.g., vacuum residual stream) flows through the hollow interior 12 to pre-heat the crude oil stream as the stream flows through the hollow interior 15 towards the furnace. Alternatively, it is contemplated that the crude oil may flow through the hollow interior 12 of the housing 11. The housing 11 and the tubes 14 are preferably formed from a steel composition. It is contemplated that the housing 11 and the tubes 14 may be formed from the same material. It is also contemplated that the housing 11 and the tubes 14 may be formed from different materials. Typically, the tubes and the housing are formed from a carbon or low chromium content steel.

Figure 5:
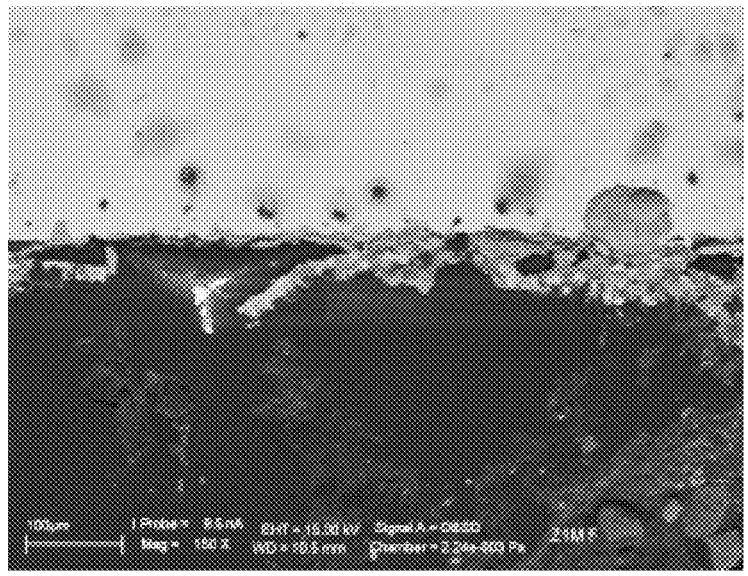
FIGS. 5 and 6 are images illustrating the fouling on a conventional heat exchanger tube after a field trial.
Figure 6:
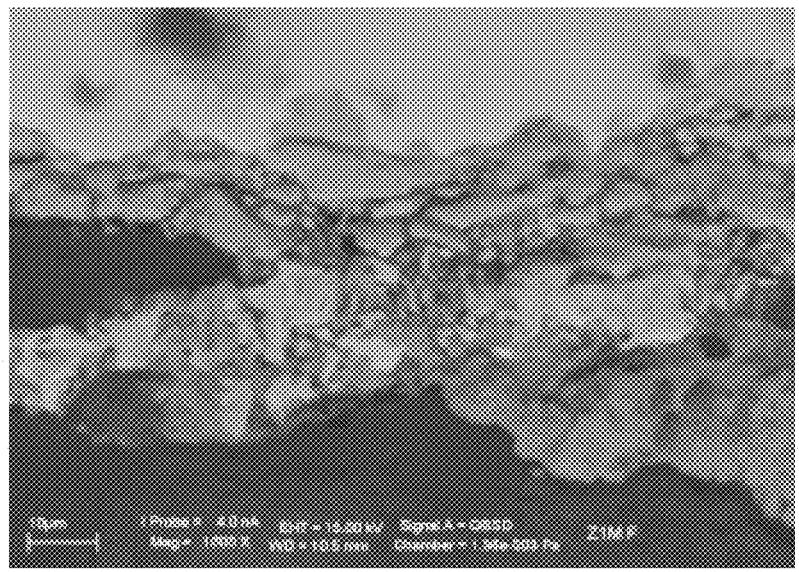

As described above, heat exchangers are typically subject to fouling after prolonged exposure to crude oil. The presence of fouling reduces the performance of the heat exchanger. FIGS. 5 and 6 illustrate the effects of fouling on the surface of a heat exchanger tube. The presence of fouling reduces throughput and increases fuel consumption. FIGS. 5 and 6 illustrate the amount of fouling present within the heat exchanger tube after five months of operation. This fouling represents an approximately 31% reduction in the heat exchanger efficiency in the refinery. The foulant contains sodium chloride, iron sulfide and carbonaceous materials. As shown in FIGS. 5 and 6, significant amounts of pitting are present. Pitting can further exacerbate the fouling problem.

Figure 7:
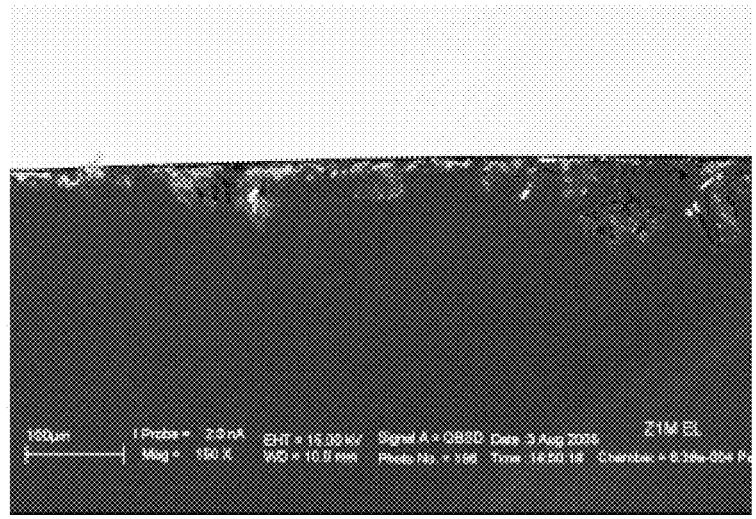
FIGS. 7 and 8 are images illustrating the significant reduction in fouling on a heat exchanger tube in accordance with the present invention after a field trial.
Figure 8:
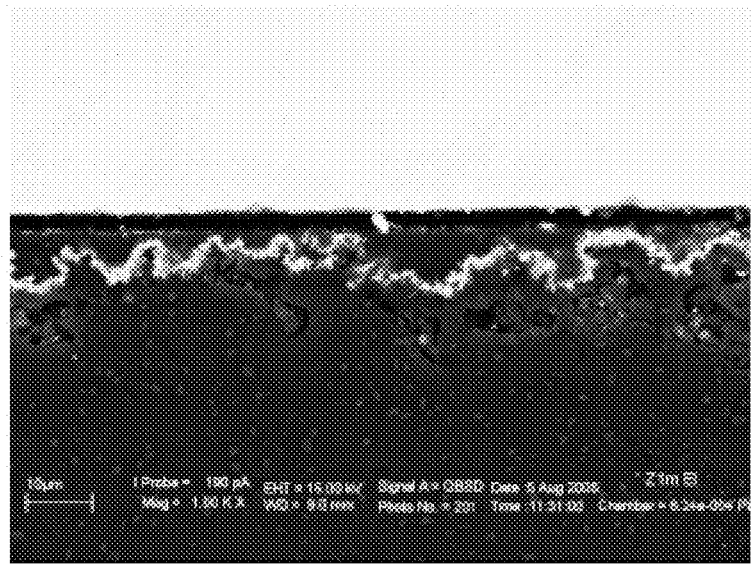

By contrast, FIGS. 7 and 8 illustrate the reduction in fouling utilizing heat exchanger tubes 14 which embody the principles of the present invention. The surface cross-sections illustrated in FIGS. 7 and 8 illustrate a marked reduction in fouling. These tubes were located in the same heat exchanger and subject to the same operating conditions over the same five month period. While the foulant present in the exchanger tube 14 also contained sodium chloride, iron sulfide and carbonaceous material, the amount of foulant was significantly reduced. The thickness of the foulant was reduced to less than 10 microns. The tubes having the reduced surface roughness also exhibited less pitting. The conventional tubes illustrated in FIGS. 5 and 6 exhibited a mean foulant deposit weight density of 46 mg/cm$^2$. By contrast, the tubes 14 constructed using principles in accordance with the present invention illustrated at least 50% reduction in the mean foulant deposit weight density. The sample tubes exhibited a mean foulant deposit weight density of 22 mg/cm$^2$. Deposit weight density was determined by the National Association of Corrosion Engineers (NACE) method TM0199-99. The reduction in fouling shown in FIGS. 7 and 8 illustrate the benefits of the present invention.

The reduction in fouling may be obtained as a result of controlling the surface roughness of the inner diameter surface and the outer diameter surface of the tubes 14 and/or the interior surface of the shell 11. Controlling the surface roughness of the inner diameter surface of the tubes mitigates the fouling of process fluid or crude oil within the tubes 14. Controlling the surface roughness of the outer diameter surface of the tubes 14 and the inner surface of the shell 11 mitigates fouling associated with the heating fluid (e.g., vacuum residual) flowing within the hollow interior 12. In accordance with the present invention, at least one of the interior surface of the hollow interior 12 and the surfaces of the tubes 14 has a surface roughness of less than 40 micro inches (1.1 μm). Surface roughness can be measured in many ways. Industry prefers to use a skidded contact profilometer. Roughness is routinely expressed as the arithmetic average roughness (Ra). The arithmetic average height of roughness component of irregularities from the mean line is measured within the sample length L. The standard cut-off is 0.8 mm with a measuring length of 4.8 mm. This measurement conforms to ANSI/ASME B46.1 "Surface Texture-Surface Roughness, Waviness and Lay," which was employed in determining the surface roughness in accordance with the present invention. A uniform surface roughness of less than 40 micro inches (1.1 μm) produces a significant reduction in fouling.

Further reductions in surface roughness are desirable. It is preferable that the surface roughness be below 20 micro inches (0.5 μm). It is more preferable that the surface roughness be below 10 micro inches (0.25 μm). It is preferable that both the inner diameter surface and the outer diameter surface have the described surface roughness. The desired surface roughness may be obtained through various techniques including but not limited to mechanical polishing and electro-polishing. In the samples illustrated in FIGS. 5 and 6, the surface roughness of the tubes was variable between 38 and 70 micro inches. The tubes in FIGS. 5 and 6 were not polished. The tubes illustrated in FIGS. 7 and 8, which form the basis for the present invention were polished to a more uniform 20 micro inches (0.5 μm). This was accomplished using conventional mechanical polishing techniques. The tubes were then electro-polished in an acidic electrolyte to produce a reflective surface having a surface roughness below 10 micro inches (0.25 μm). The treated tubes exhibited a marked reduction in fouling.

Figure 2:
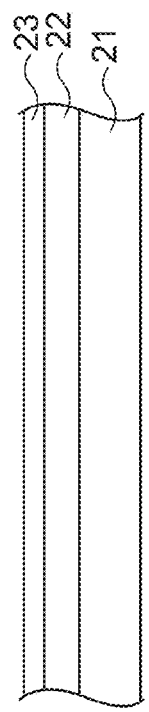
FIG. 2 is a schematic view illustrating the various layers forming the steel composition utilized in forming the heat transfer components in accordance with an embodiment of the present invention.
Figure 4:
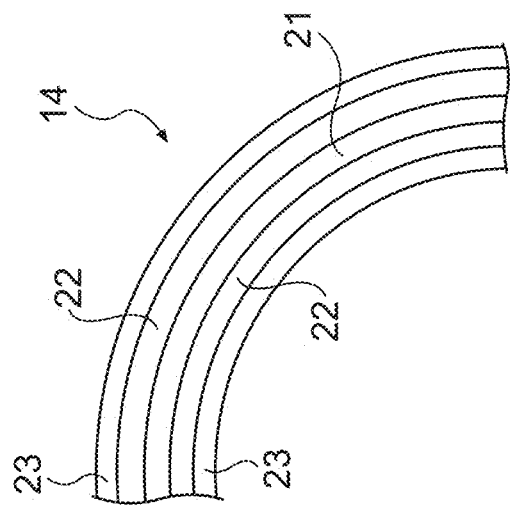
FIG. 4 is a partial sectional view of a heat exchanger tube in accordance with the present invention.

In accordance with the present invention, it is preferable that the tubes 14 be formed from a steel composition that is resistant to sulfidation or sulfidic corrosion and depositional fouling. The use of such a steel composition significantly reduces fouling, which produces numerous benefits including an increase in heating efficiency, a reduction in the amount of energy needed to pre-heat the crude oil, and a significant reduction in refinery downtime and throughput. It is preferable that the tubes 14 and/or the housing 11 of the pre-heat exchanger have several layers, as illustrated in FIGS. 2 and 4. The primary layer 21 is a steel composition containing three primary components or constituents X, Y and Z. X denotes a metal that is selected from the group preferably consisting of Fe, Ni, and Co. X may also contain mixtures of Fe, Ni and Co. Y denotes Cr. In accordance with the present invention, a steel composition contains Cr at least greater than 1 wt. % based on the combined weight of the three primary constituents X, Y and Z. Higher Cr contents are desirable for improved sulfidation or sulfidic corrosion resistance. It is preferable that the Cr content be higher than 5 wt. % based on the combined weight of three primary constituents X, Y and Z. It is more preferable that the Cr content be higher than 10 wt. % based on the combined weight of three primary constituents X, Y and Z. Z is preferably an alloying element.

In accordance with the present invention, Z preferably includes at least one alloying element selected from the group consisting of Si, Al, Mn, Ti, Zr, Hf, V, Nb, Ta, Mo, W, Sc, Y, La, Ce, Pt, Cu, Ag, Au, Ru, Rh, Ir, Ga, In, Ge, Sn, Pb, B, C, N, O, P, and S. Z may also contain mixtures of Si, Al, Mn, Ti, Zr, Hf, V, Nb, Ta, Mo, W, Sc, Y, La, Ce, Pt, Cu, Ag, Au, Ru, Rh, Ir, Ga, In, Ge, Sn, Pb, B, C, N, O, P, and S. The weight percent of an alloying element is preferably higher than 0.01 wt. %, and more preferably higher than 0.05 wt. %, and most preferably higher than 0.1 wt. %, based on the combined weight of three primary constituents X, Y and Z. The combined weight percent of all alloying elements in a steel composition is preferably less than 10 wt. %, and more preferably less than 5 wt. %, based on the combined weight of three primary constituents X, Y and Z. While other compositions are considered to be within the scope of the present invention, the above-described composition has been found to reduce fouling.

Table 1 illustrates non-limiting examples of a steel composition that is resistant to sulfidation or sulfidic corrosion and corrosion induced fouling for use in both refining and petrochemical applications. Other materials exhibiting similar properties are considered to be well within the scope of the present invention provided such materials fall within the scope of the prescribed ranges.

TABLE 1

| Name (Grade) | UNS Number | Constituent X in wt. % | Constituent Y in wt. % | Constituent Z in wt. % |
|---|---|---|---|---|
| T11 | K11562 | Balanced Fe | 1.25Cr | 0.5Mo, 0.5Si, 0.3Mn, 0.15C, 0.045P, 0.045S |
| T22 | K21590 | Balanced Fe | 2.25Cr | 1.0Mo, 0.5Si, 0.3Mn, 0.15C, 0.035P, 0.035S |
| T5 | S50100 | Balanced Fe | 5Cr | 0.5Mo, 0.5Si, 0.3Mn, 0.15C, 0.04P, 0.03S |
| T9 | J82090 | Balanced Fe | 9Cr | 1.0Si, 0.35Mn, 0.02C, 0.04P, 0.045S |
| 409 | S40900 | Balanced Fe | 10.5Cr | 1.0Si, 1.0Mn, 0.5Ni, 0.5Ti, 0.08C, 0.045P, 0.045S |
| 410 | S41000 | Balanced Fe | 11.5Cr | 0.15C, 0.045P, 0.03S |
| 430 | S43000 | Balanced Fe | 16Cr | 1.0Si, 1.0Mn, 0.12C, 0.045P, 0.03S |
| XM-27 E-Brite | S44627 | Balanced Fe | 25Cr | 0.5Ni, 0.75Mo, 0.4Si, 0.4Mn, 0.05Nb, 0.2Cu, 0.01C, 0.02P, 0.02S, 0.015N |
| SeaCure | S44660 | Balanced Fe | 25Cr | 1.5Ni, 2.5Mo, 1.0Si, 1.0Mn, 0.05Nb, 0.2Cu, 0.025C, 0.04P, 0.03S, 0.035N |
| 304 | S30400 | Bal. Fe, 8Ni | 18Cr | 2.0Mn, 0.75Si, 0.08C, 0.04P, 0.03S |
| 304L | S30403 | Bal. Fe, 8Ni | 18Cr | 2.0Mn, 0.75Si, 0.035C, 0.04P, 0.03S |
| 309S | S30908 | Bal. Fe, 12Ni | 22Cr | 2.0Mn, 0.75Si, 0.75Mo, 0.08C, 0.045P, 0.03S |
| 310 | S31000 | Bal. Fe, 19Ni | 24Cr | 2.0Mn, 1.5Si, 0.75Mo, 0.25C, 0.045P, 0.03S |
| 316 | S31600 | Bal. Fe, 11Ni | 16Cr | 2.0Mn, 0.75Si, 2.0Mo, 0.08C, 0.04P, 0.03S |
| 316L | S31603 | Bal. Fe, 11Ni | 16Cr | 2.0Mn, 0.75Si, 2.0Mo, 0.035C, 0.04P, 0.03S |
| 321 | S32100 | Bal. Fe, 9Ni | 17Cr | 2.0Mn, 0.75Si, 0.4Ti, 0.08C, 0.045P, 0.03S |
| 2205 | S32205 | Bal. Fe: 4.5Ni | 22Cr | 2.0Mn, 1.0Si, 3.0Mo, 0.03C, 0.14N, 0.03P, 0.02S |
| 2507 | S32507 | Bal. Fe: 6Ni | 24Cr | 1.2Mn, 0.8Si, 3.0Mo, 0.5Cu, 0.03C, 0.2N, 0.035P, 0.02S |
| AL-6XN | N08367 | Bal. Fe: 24Ni | 20Cr | 6.2Mo, 0.4Si, 0.4Mn, 0.22N, 0.2Cu, 0.02C, 0.02P, 0.03S, 0.035N |
| Alloy 800 | N08800 | Bal. Fe: 30Ni | 19Cr | 0.15Ti, 0.15Al |

The chromium enrichment at the surface of the non-fouling surface is advantageous. Therefore, the steel composition preferably includes a chromium enriched layer 22. The Cr-enriched layer 22 is formed on the primary layer 21. The layer 22 may be formed on both the inner surface and the exterior surface of the tubes. The thickness of the Cr-enriched layer 22 is greater than 10 angstroms. The Cr-enriched layer 22 contains the same three primary components or constituents X, Y and Z. X denotes a metal that is selected from the group preferably consisting of Fe, Ni, and Co. X may also contain mixtures of Fe, Ni, Co and Ti. Y denotes Cr. It is contemplated that Y may also comprise Ni, O, Al, Si and mixtures thereof. The percentage of Cr is higher in layer 22 when compared to the primary layer 21. In accordance with the present invention, Cr content in layer 22 is at least greater than 2 wt. % based on the combined weight of three primary constituents X, Y and Z. It is preferable that the Cr content be higher than 10 wt. % based on the combined weight of three primary constituents X, Y and Z. It is more preferable that the Cr content be higher than 30 wt. % based on the combined weight of three primary constituents X, Y and Z. In the layer 22, the ratio of Y to X is greater than the ratio of Y to X in the layer 21. The ratio should be greater by a factor of at least 2. The ratio should preferably be greater by a factor of at least four. More preferably, the ratio should be a greater by a factor of eight. Z is preferably an alloying element.

For example, 5-chrome steel (T5) nominally contains about 5 wt. % chromium per about 95 wt. % iron to give an untreated surface ratio of 0.05 in the primary layer 21. In the Cr-enriched layer 22, the ratio increased to at least 0.1, preferably to 0.2 and most preferably to 0.4 chromium atoms per iron atom in the surface layer of the heat exchanger tube. For 316L stainless steel, which has nominally 16 wt. % Cr, 11 wt. % Ni, 2 wt. % Mn, 2 wt. % Mo, the bulk ratio of chromium to iron would be 16/69=0.23. After treatment to enrich the surface chromium, the ratio may rise to at least 0.46, preferably 0.92 and most preferably 1.84.

In the Cr-enriched layer 22, Z preferably includes at least one alloying element selected from the group consisting of Si, Al, Mn, Ti, Zr, Hf, V, Nb, Ta, Mo, W, Sc, Y, La, Ce, Pt, Cu, Ag, Au, Ru, Rh, Ir, Ga, In, Ge, Sn, Pb, B, C, N, O, P, and S. The weight percent of an alloying element is preferably higher than 0.01 wt. %, and more preferably higher than 0.05 wt. %, and most preferably higher than 0.1 wt. %, based on the combined weight of three primary constituents X, Y and Z.

It is contemplated that the Cr-enriched layer 22 may be formed on two sides of the primary layer 21 such that both the interior surface and the exterior surface contain a Cr-enriched layer. The Cr-enriched layer 22 may be formed on the primary layer 21 using one of several techniques. The Cr-enriched layer may be formed by electro-polishing the tube in a solution containing chromic acid. This is effective when the Cr content in the steel composition is less than about 15 wt. %. It is also contemplated that the Cr-enriched layer 22 may be formed using various other formation techniques including but not limited to electroplating chromium onto another alloy such as a carbon steel, bright annealing, passivation, thermal spray coating, laser deposition, sputtering, physical vapor deposition, chemical vapor deposition, plasma powder welding overlay, cladding, and diffusion bonding. It is also possible to choose a high chromium alloy including but not limited to 304L stainless steel, 316 stainless steel and AL6XN alloy. In accordance with the present invention, the secondary layer 22 may be mechanically polished and/or electro-polished as described above in order to obtain a uniform surface roughness of less than 40 micro inches (1.1 μm), preferably less than 20 micro inches (0.5 μm) and more preferably less than 10 micro inches (0.25 μm). The desired surface roughness can also be achieved using fine abrasive polishing or metal peening.

The Cr-enriched layer 22 may be formed on the primary layer 21 by bright annealing the tube. Bright annealing is an annealing process that is carried out in a controlled atmosphere furnace or vacuum in order that oxidation is reduced to a minimum and the surface remains relatively bright. The process conditions such as atmosphere, temperature, time and heating/cooling rate utilized during the bright annealing process will be dependent on the metallurgy of the alloy being acted upon. The skilled artisan can easily determine the conditions based on the alloy's metallurgy. As a non-limiting example, the austenitic stainless steel such as 304L can be bright annealed in either pure hydrogen or dissociated ammonia, provided that the dew point of the atmosphere is less than −50° C. and the tubes, upon entering the furnace, are dry and scrupulously clean. Bright annealing temperatures usually are above 1040° C. Time at temperature is often kept short to hold surface scaling to a minimum or to control grain growth.

In accordance with the present invention, a protective layer 23 is preferably formed on the Cr-enriched layer 22. The Cr-enriched layer 22 is necessary for the formation of the protective layer 23. The protective layer may be an oxide layer, a sulfide layer, an oxysulfide layer or any combination thereof. The protective layer 23 preferably includes a material such as a magnetite, an iron-chromium spinel, a chromium oxide, oxides of the same and mixtures thereof. The layer 23 may also contain a mixed oxide sulfide thiospinel. While it is possible to form the protective layer 23 on the Cr-enriched layer 22 prior to installation of the tubes 14 within the housing 11 of the pre-heat exchanger 10, the protective layer 23 is preferably formed on the Cr-enriched layer 22 after the tubes 14 are located within the exchanger 10 and the pre-heat exchanger is operational. The protective layer 23 forms when the Cr-enriched layer is exposed to the process stream at high temperatures. In a late-train heat exchanger application, the protective layer forms at temperatures up to 400° C. In applications in a furnace or outside the late-train heat exchanger, the protective layer forms at temperatures up to 600° C. In petrochemical applications including use in steam cracker and reformer tubes, the protective layer forms at temperatures up to 1100° C. The thickness of the protective layer 23 is preferably greater than 100 nm, more preferably greater than 500 nm, and most preferably greater than 1 micron. As illustrated in FIGS. 6 and 7, a field trial of 5-chrome steel revealed about 1 micron thick Cr-enriched magnetite layer formed during about 4 months of period. Since the stream oil flowing within a heat exchanger tube is a highly reducing and sulfidizing environment, the protective layer 23 can further convert to a mixed oxide-sulfide layer or a thiospinel-type sulfide layer after prolonged exposure. Applicants note that the formation of the protective layer 23 is a result of the electro-polishing of the Cr-enriched layer 21.

The formation of the protective layer further reduces fouling. The foulants, which form on the protective layer 23 exhibit significantly less adhesion characteristics when compared to foulants, which form on surfaces that do not have the protective layer. One benefit of this reduced adhesion lies in the cleaning of the heat exchange surface. Less time is required to remove any foulants from the tubes. This results in a decrease in downtime such that the pre-heat exchanger can be serviced in a more efficient manner and placed back online sooner. Also, with a less adherent deposit, on-line cleaning methods may become more effective or at least more rapid, which will further reduce downtime and throughput loss.

There are numerous additional benefits of reducing the surface roughness of the tubes 14. One of the benefits is the shifting from a linear growth rate of the foulant, which results in the continuous thickening of the foulant deposit; to an asymptotic growth rate which reaches a finite thickness and then stops thickening.

The tubes 14 disclosed above may be used to form new heat exchangers. The tubes 14 can also be used in existing exchangers as replacement tubes. The use of the tubes 14 should produce significant benefits in the refinery operations. In addition to reducing fouling, there is a reduction in the number of scheduled downtimes the heat exchangers operate more efficiently because the harmful effects of fouling are reduced. In addition, as demonstrated in the field test, the use of the tubes 14 will also prolong tube life due to reduced pitting corrosion.

The tubes 14 in accordance with the present invention may be used to retrofit an existing heat exchanger during a scheduled downtime. The existing tubes can be removed from the heat exchanger. The tubes 14 having the above described surface roughness and/or material composition are installed in the interior 12 of the housing 11. While it is preferable to replace all of the existing heat exchanger tubes with replacement tubes having the above-described construction in order to maximize the reduction in fouling, the present invention is not intended to be so limited. It is contemplated that only a portion of the existing heat exchanger tubes be replaced with replacement tubes. While such a construction may not result in the same reduction in fouling, a degree of fouling mitigation will be obtained. The determination of the number and location of existing tubes to be replaced by the replacement tubes can be determined by a physical inspection of the tubes within the bundle within the heat exchanger. The tubes located closest to the furnace may be more prone to fouling. As such, it is also contemplated that tubes located most closely to the furnace may be replaced with tubes 14.

Figure 9:
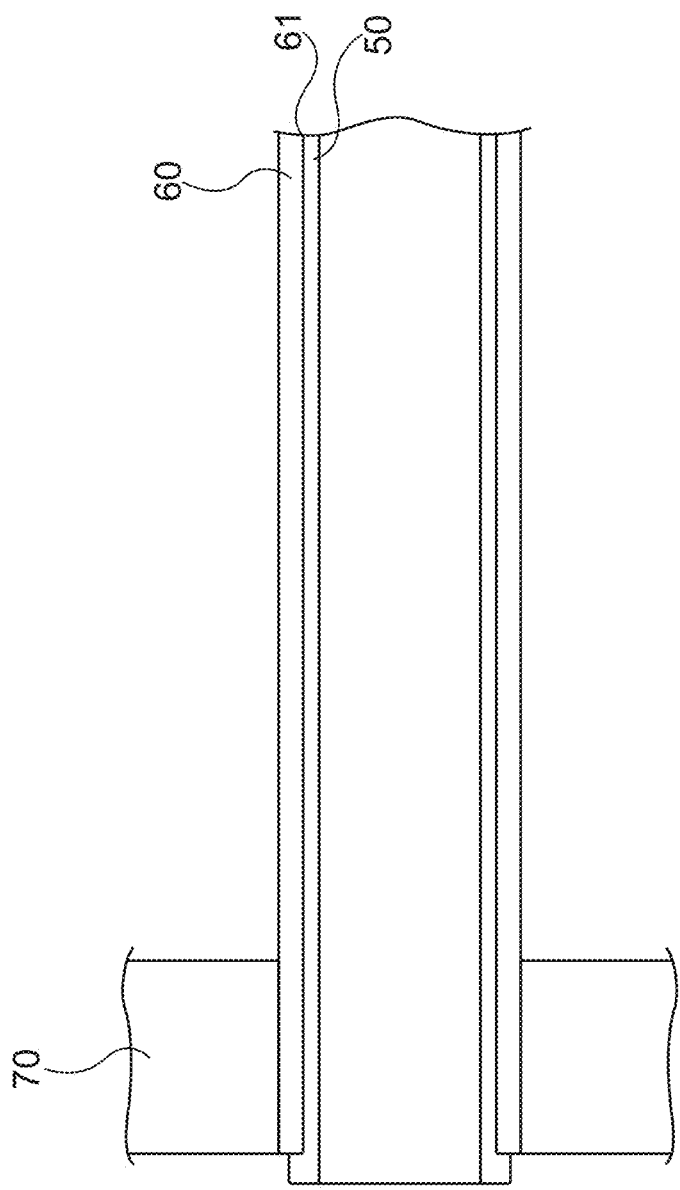
FIG. 9 is an insert sleeve in accordance with the present invention.

It may not be cost effective to replace all or a portion of the tubes of the heat transfer component with tubes 14 constructed in accordance with the principles of the present invention. In accordance with another aspect of the present invention, an insert 50 is provided for use in retrofitting existing heat transfer components to mitigate fouling. The insert 50 will be described in connection with FIG. 9. The insert 50 is sized such that the outer diameter of the insert is sized to abut the inner diameter surface of the tube 60. The tube 60 is secured to a tube sheet 70. Since it is intended that the insert 50 is to be retrofit in existing operation heat transfer components, it is contemplated that a layer of corrosion 61 (e.g., an oxidized layer) may exist between the tube 60 and the insert 50. It is also possible to use the insert for fitting over a tube. In this case, the insert is sized to closely surround the tube, which is susceptible to fouling, build-up or corrosion on its outer diameter surface. The insert 50 in accordance with the present invention may be constructed from any of the materials described herein having the above described surface roughnesses. It is important that the insert or sleeve 50 contact the tube 60 such that the heat transfer properties are not adversely or significantly diminished.

One advantage of the use of inserts 50 is that it allows one to retrofit an existing heat exchanger and convert it thereby to a non-fouling heat exchanger. This avoids the cost and time associated with the construction of a new bundle. For example, an existing heat exchanger subject to repeated fouling and requiring significant downtime due to required cleaning could be retrofitted with stainless steel inserts and electropolished in situ to achieve a smooth, corrosion-resistant, non-fouling tube inner diameter surface. This would be much cheaper than replacing the entire heat exchanger bundle with a stainless steel equivalent (including tube sheets and baffles) and using electro-polished stainless steel tubes.

An additional advantage is that in some applications, it is not possible to use solid tubes made of a given alloy, even if this could prevent fouling on the inner diameter. As such, it is possible to use an insert with new or replacement tubes. For example, there are real world examples where fouling on the tube inner diameter could be prevented by use of an electropolished stainless steel tube instead of the currently used 5-chrome tube. However, in this case, the shell side, or the tube outer diameter, is exposed to an aqueous environment at elevated temperatures where stainless steel cannot be used. The potential for stress corrosion cracking is the issue. The advantage of the present invention is that an electro-polished stainless steel insert can be used within the 5-chrome tube. The electro-polished stainless steel inserts reduces fouling on the tube inner diameter and the 5-chrome tube itself is adequate with respect to the aqueous environment on the tube outer diameter. Similarly, highly corrosion resistant and reduced surface roughness titanium alloy inserts could be inserted within a less corrosion resistant outer tube for use in applications where a highly corrosive process fluid is passing though the tubes and a less corrosive fluid is in contact with the outer diameter. These are just two examples of the generic situation where the use of electro-polished inserts may be the only feasible route to reducing tube inner diameter fouling.

The insert 50 is relevant to fouling beyond the petroleum and petrochemical industries. Other potential applications include for example, black liquor fouling and paper slurry pipe systems in the paper and pulp industry, microbiological contamination (bio-fouling) in the water treatment and distillation industry, product contamination in the pharmaceutical and semiconductor industries, reduction of contamination pick-up and increasing the effectiveness of conventional decontamination techniques for recirculation piping in the nuclear power industry and piping and exchangers used in the food, dairy and beverage industries where product build-up is a problem. Polymer sheeting in chemical reactor piping and heat exchangers used to produce polymers could also benefit as well as heat exchangers used to remove water during crystallization processes. There are many other examples of heat exchanger and piping fouling that can be ameliorated by this invention.

Many potential metal types can be used in this invention and the metal chosen will depend on the nature of the fluid stream and the type of fouling that is being prevented. Though austenitic stainless steels such as types 304 and 316 can be used to fabricate the tube inserts, other stainless steel alloys could also be used, such as martensitic stainless steels such as type 410, ferritic stainless steels such as type 430. Other high performance alloys could also be considered such as super-austenitic stainless steels such as AL-6XN, duplex steels such as alloy 2205 and superferritic grades. Nickel based alloys will also be useful in certain environments and include the Ni—Cu, Ni—Cr—Fe, and Ni—Cr—Mo—Fe families of alloys. Cobalt and titanium alloys are also possible as well as pure metal inserts. Any metal or alloy that can be electropolished or otherwise smoothed is a possible material for use as an insert.

As is currently the case with installing inserts into heat exchanger tubes, good metal-to-metal contacting must be insured in order to minimize heat transfer losses that could occur due to air gaps between the outer tube and the tube liner. In all cases, the tube inner diameter must be as clean as possible and free of solids or liquids before the insert is expanded. Even with cleaning, a layer of corrosion 61 may exist. Ensuring a clean surface is relatively straight forward for new tubing, but can be more problematic for used tubing. Hydroblasting of the used tube, drying and light mechanical honing may be required. Following hydrostatic expansion of the insert, mechanical rolling of the ends of the inserts is also required to produce a good mechanical seal between the insert and the outer tube. A tube would be similarly prepared for use with an "outer" insert or sleeve.

Figure 3:
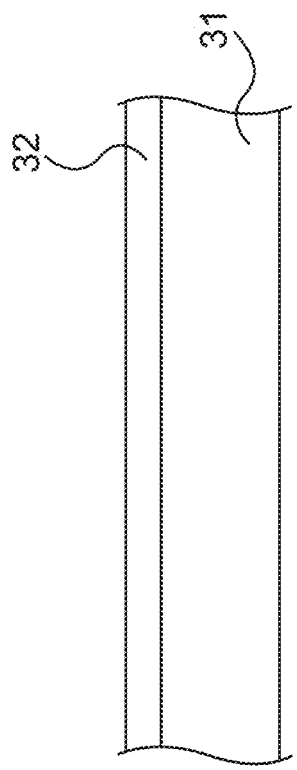
FIG. 3 is a schematic view illustrating the various layers forming the aluminum clad carbon steel utilized in forming the heat transfer components in accordance with an another embodiment of the present invention.

A variation of the present invention will now be described in greater detail in connection with FIG. 3. FIG. 3 illustrates an aluminum or aluminum alloy coated carbon steel that may be effective in reducing corrosion and mitigating fouling. A carbon steel layer 31 is coated or clad with an aluminum layer 32. The aluminum layer or aluminum alloy may be applied by immersion of the steel in molten aluminum or aluminum alloy or by thermal spraying of aluminum powder or wire that is atomized. When used in a tube 14, the aluminum layer 32 is located on both the inner diameter surface and the outer diameter surface of the tube 14 similar to the Cr-enriched layer 22.

In accordance with another aspect of the invention, the heat transfer component, such as heat exchange tubes or inserts, can be constructed from a chromium-enriched oxide containing the material having a composition containing $\delta$, $\epsilon$, and $\zeta$. In this case, $\zeta$ is a steel containing at least about 5 to about 40 wt. % chromium. $\epsilon$ is a layer formed on the surface of the steel $\zeta$ and is a chromium-enriched oxide ($M_3O_4$ or $M_2O_3$ or mixtures thereof) wherein the metal M contains at least 5 wt. % Cr based on the total weight of the metal M. $\delta$ is a top layer formed on the surface of the chromium-enriched oxide $\epsilon$ comprising sulfide, oxide, oxysulfide, and mixtures thereof.

The steel $\zeta$ contains at least about 5 to about 40 wt. % chromium and is selected from low chromium steels, ferritic stainless steels, martensitic stainless steels, austenetic stainless steels, duplex stainless steels and precipitation-hardenable alloys. A non-limiting example of the base metal $\zeta$ is listed in Table 2, below.

| Base Metal, $\zeta$ | Alloy | UNS No. | Alloy Compositions (Weight %) |
|---|---|---|---|
| Low chromium steels | T5 | S50100 | Bal. Fe: 5Cr: 0.5Mo, 0.5Si, 0.3Mn, 0.15C, 0.04P, 0.03S |
| | T9 | J82090 | Bal. Fe: 9Cr: 1.0Si, 0.35Mn, 0.02C, 0.04P, 0.045S |
| Ferritic stainless steels | 409 | S40900 | Bal. Fe: 10.5Cr: 1.0Si, 1.0Mn, 0.5Ni, 0.5Ti, 0.08C, 0.045P, 0.045S |
| | 410 | S41000 | Bal. Fe: 11.5Cr: 0.15C, 0.045P, 0.03S |
| | 430 | S43000 | Bal. Fe: 16.0Cr: 1.0Si, 1.0Mn, 0.12C, 0.045P, 0.03S |
| Austenetic stainless steels | 304 | S30400 | Bal. Fe: 8Ni: 18Cr: 2.0Mn, 0.75Si, 0.08C, 0.04P, 0.03S |
| | 310 | S31000 | Bal. Fe: 19Ni: 24Cr: 2.0Mn, 1.5Si, 0.75Mo, 0.25C, 0.045P, 0.03S |
| | 253 MA | S30815 | Bal. Fe: 11Ni: 21Cr: 1.7Si, 0.04Ce, 0.17N, 0.08C |
| | RA8 5H | S30615 | Bal. Fe: 14.5Ni: 18.5Cr: 3.5Si: 1.0Al, 0.2C |
| Duplex stainless steels | 2205 | S32205 | Bal. Fe: 4.5Ni: 22Cr: 2.0Mn, 1.0Si, 3.0Mo, 0.03C, 0.14N, 0.03P, 0.02S |
| | 2507 | S32507 | Bal. Fe: 6Ni: 24Cr: 1.2Mn, 0.8Si, 3.0Mo, 0.5Cu, 0.03C, 0.2N, 0.035P, 0.02S |

The chromium-enriched oxide $\epsilon$ ($M_3O_4$ or $M_2O_3$ or mixtures thereof) can be formed on the surface of the steel $\zeta$ before use of the chromium-enriched oxide containing material, for example in a late-train crude preheat exchanger. The metal M of the chromium enriched oxide $\epsilon$ ($M_3O_4$ or $M_2O_3$ or mixtures thereof) preferably contains at least 5 wt. % Cr, preferably at least 10 wt. % Cr, based on the total weight of the metal M. The metal M of the chromium enriched oxide ε ($M_3O_4$ or $M_2O_3$ or mixtures thereof) preferably comprises Fe, Cr, and constituting elements of the steel ζ. Constituting elements of the steel ζ contain Ni, Co, Mn, Al, Si, B, C, N, P, Y, Ce, Ti, Zr, Hf, V, Nb, Ta, Mo, W, and mixtures thereof. The metal M of the chromium enriched oxide ε ($M_3O_4$ or $M_2O_3$ or mixtures thereof) is preferred to be Cr-rich. Excessive partitioning of Cr in the chromium enriched oxide ε ($M_3O_4$ or $M_2O_3$ or mixtures thereof) attributes to superior corrosion resistance of the steel ζ. Chromium preferably enters to vacancy sites of the oxide lattice and effectively suppresses iron transport from the steel, a prerequisite for sustaining corrosion.

The chromium enriched oxide ε ($M_3O_4$ or $M_2O_3$ or mixtures thereof) is formed on the surface of the steel ζ by exposing the steel ζ to a low oxygen partial pressure environment at a temperature of from about 300° C. to 1100° C. for a time sufficient to effect the formation of a chromium enriched oxide ($M_3O_4$ or $M_2O_3$ or mixtures thereof) on the surface of the steel. Thermodynamically, an oxide forms on a metal surface when the oxygen potential in the environment is greater than the oxygen partial pressure in equilibrium with the oxide. For example, the partial pressure of oxygen in equilibrium with $Cr_2O_3$ at 1000° C. is about $10^{-21}$ atm. This implies that the formation of $Cr_2O_3$ is favored thermodynamically at 1000° C. in environments with oxygen partial potentials higher than $10^{-21}$ atm.

A low oxygen partial pressure environment can be generated from gases selected from the group consisting of $CO_2$, CO, $CH_4$, $NH_3$, $H_2O$, $H_2$, $N_2$, Ar, He and mixtures thereof. As a non-limiting example, $CO_2/CO$ and $H_2O/H_2$ gas mixtures can be used. A time sufficient to effect the formation of the chromium enriched oxide ε ($M_3O_4$ or $M_2O_3$ or mixtures thereof) on the surface of the steel ranges from 1 min to 100 hrs. The thickness of the chromium-enriched oxide ε ($M_3O_4$ or $M_2O_3$ or mixtures thereof) ranges from at least about 1 nm to about 100 μm, preferably from at least about 10 nm to about 50 μm, more preferably from at least about 100 nm to about 10 μm. The chromium-enriched oxide ε provides superior corrosion and fouling resistance beneficial in heat exchanger tubes in refinery applications.

The chromium enriched oxide ε ($M_3O_4$ or $M_2O_3$ or mixtures thereof) may be formed on the surface of the steel ζ by bright annealing method. Bright annealing is an annealing process that is carried out in a controlled atmosphere furnace or vacuum to provide low oxygen partial pressure environments in order that oxidation is reduced to a minimum and the surface remains relatively bright. The process conditions such as atmosphere, temperature, time and heating/cooling rate utilized during the bright annealing process are dependent on the metallurgy of the alloy being acted upon. The skilled artisan can easily determine the conditions based on the alloy's metallurgy. As a non-limiting example, the austenitic stainless steel such as 304L can be bright annealed in either pure hydrogen or argon or dissociated ammonia, provided that the dew point of the atmosphere is less than −40° C. and the tubes, upon entering the furnace, are dry and scrupulously clean. Bright annealing temperatures usually are above about 1038° C. Time at temperature is often kept short to hold surface scaling to a minimum or to control grain growth. Vacuum furnaces can generally achieve the best atmospheric quality for bright annealing purposes. Vacuum levels in the furnace must be better than $1\times10^{-3}$ Torr. Fast cooling in vacuum furnaces is generally achieved by back filling the chamber with argon or nitrogen and then re-circulating this gas at high velocity through a heat exchanger to remove heat.

For the top layer δ, sulfide and oxysulfide form on the surface of the chromium-enriched oxide ε in-situ during use of the chromium-enriched oxide containing material, in a late-train crude preheat exchanger for instance. The temperature at which the protective layer forms varies. In a late-train heat exchanger applications, the protective layer forms at temperatures up to 400° C. In applications in a furnace or outside the late-train heat exchanger, the protective layer forms at temperatures up to 600° C. In petrochemical applications including use in steam cracker and reformer tubes, the protective layer forms at temperatures up to 1050° C. The temperatures utilized during the formation of the protective layer will be dependent on the metallurgy of the steel being acted upon. The skilled artisan can easily determine the upper temperature constraints based on the steel's metallurgy. The top layer δ may contain some impurities formed from the elements constituting the chromium enriched oxide ε and the steel ζ. Preferably, the top layer δ comprises iron sulfide ($Fe_{1-x}S$), iron oxide ($Fe_3O_4$), iron oxysulfide, iron-chromium sulfide, iron-chromium oxide, iron-chromium oxysulfide, and mixtures thereof. The thickness of the top layer δ ranges from at least about 0.1 μm to about 50 μm, preferably from at least about 0.1 μm to about 30 μm, more preferably from at least about 0.1 μm to about 10 μm.

Thus, the chromium-enriched oxide containing material so formed is utilized to construct a surface that reduces sulfidation corrosion and reduces depositional fouling, in heat exchangers for example, especially in late-train crude preheat exchangers. The surface has a surface roughness of less than 40 micro inches (1.1 μm), preferably less than 20 micro inches (0.5 μm), and more preferably less than 10 micro inches (0.25 μm). The chromium-enriched oxide ε ($M_3O_4$ or $M_2O_3$ or mixtures thereof) can be formed on the inner diameter (ID), the outer diameter (OD) or both the ID and the OD of the steel ζ, depending on the need for mitigating corrosion and fouling. The chromium enriched oxide ε ($M_3O_4$ or $M_2O_3$ or mixtures thereof) is formed on the surface of the steel ζ by exposing the ID, OD or both the ID and OD of the steel ζ, as described above.

Figure 10:
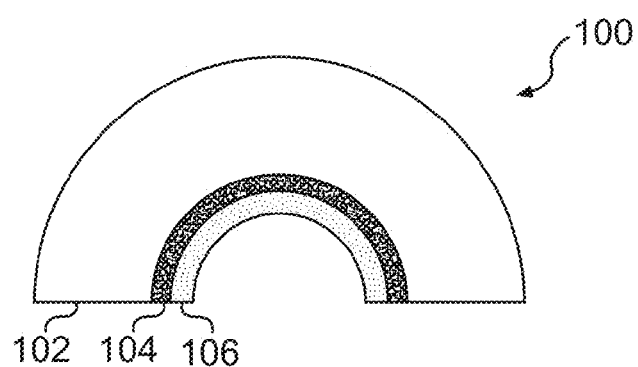
FIG. 10 is a partial side view in section of a heat transfer component having its inner diameter formed in accordance with the surface disclosed herein.

FIG. 10 shows a heat exchange component, in this case a pipe 100, having a base 102 formed of steel ζ with a layer 104 of chromium-enriched oxide ε and top layer 106 formed as a coating δ on the chromium-enriched oxide layer on the ID.

Figure 11:
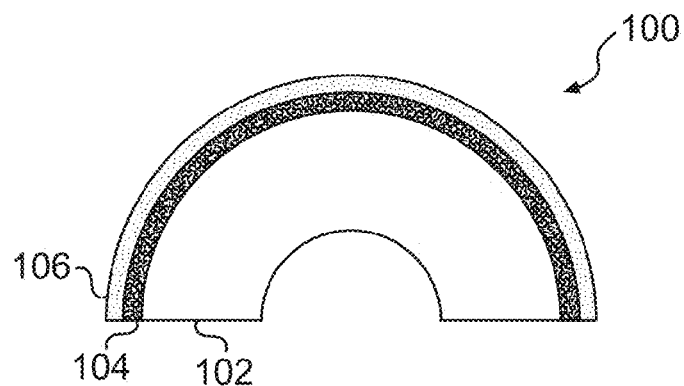
FIG. 11 is a partial side view in section of a heat transfer component having its outer diameter formed in accordance with the surface disclosed herein.

FIG. 11 shows a heat exchange component, in this case a pipe 100, having a base 102 formed of steel ζ with a layer 104 of chromium-enriched oxide ε and top layer 106 formed as a coating δ on the chromium-enriched oxide layer on the OD.

Figure 12:
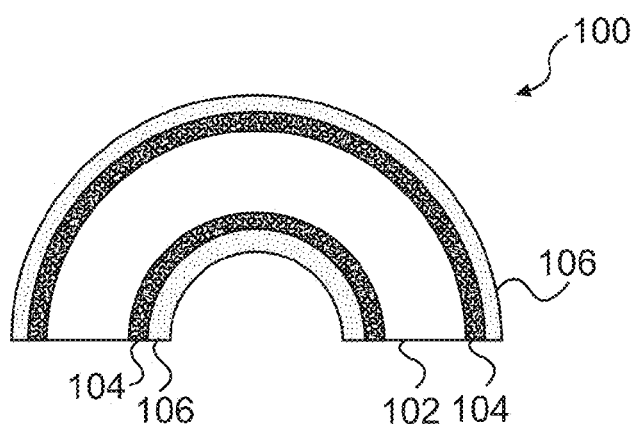
FIG. 12 is a partial side view in section of a heat transfer component having both its inner diameter and its outer diameter formed in accordance with the surface disclosed herein.

FIG. 12 shows a heat exchange component, in this case a pipe 100, having a base 102 formed of steel ζ with a layer 104 of chromium-enriched oxide ε and top layer 106 formed as a coating δ on the chromium-enriched oxide layer on both the ID and the OD.

EXAMPLE 1

A first example of forming the surface is as follows. A low chromium steel, T5, specimen is exposed to a gas mixture containing 50% $H_2O$ and 50% He at 566° C. with a flow rate of about 500 cc/min. The specimen is heated to 566° C. at a rate of 20° C./min, held for 24 hours, and cooled down to room temperature. After heat treatment of the specimen in a low oxygen partial pressure environment, the specimen is characterized by Scanning Electron Microscopy (SEM).

Figure 13:
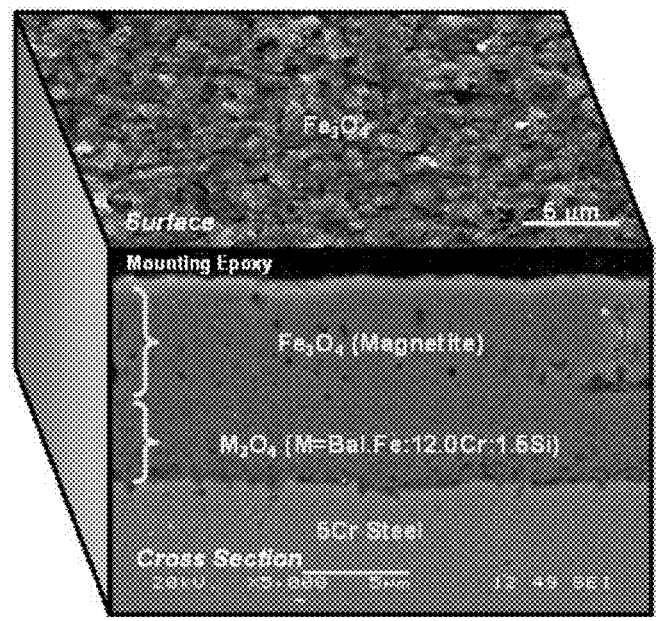
FIG. 13 shows a cross section of a surface treated as explained with respect to the first example herein; and, FIG. 14 shows a cross section of a surface treated as explained with respect to the second example herein.

FIG. 13 depicts a surface and cross sectional images of the heat treated specimen. A top layer comprising magnetite ($Fe_3O_4$) and a chromium-enriched oxide ($M_3O_4$) can be observed. The concentration of the metal M of a chromium enriched oxide ($M_3O_4$) is Balanced Fe:12.0 Cr:1.5Si in wt. %. The thickness of the top $Fe_3O_4$ layer is about 5 μm, and the thickness of a chromium-enriched oxide ($M_3O_4$) is about 4 μm.

EXAMLE 2

In a second example, the specimen as prepared in Example 1 is used for corrosion and fouling testing. The specimen is exposed to 60:40 vol. % of a crude mix at 400° C. for 4 hours in a tubing bomb test apparatus. After testing, the specimen is cleaned in toluene and acetone sequentially and characterized by SEM.

Figure 14:
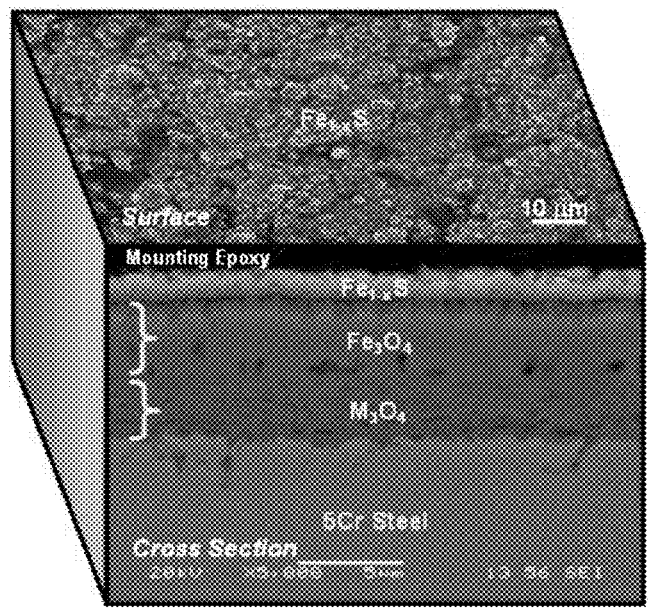

FIG. 14 depicts a surface and cross sectional images of the tested specimen. A top layer is comprised of iron sulfide ($Fe_{1-x}S$) and magnetite ($Fe_3O_4$). The thickness of the top layer is about 5 μm. A chromium-enriched oxide ($M_3O_4$) is retained. The concentration of the metal M of a chromium enriched oxide ($M_3O_4$) is Balanced Fe:12.0 Cr:1.5Si in wt. %. The thickness of a chromium-enriched oxide ($M_3O_4$) is about 4 μm.

The surface treatment can be used in any heat exchange component or with any surface susceptible to fouling or corrosion. It is also possible to use the treatment with other mechanisms for reducing fouling and corrosion. For example, the surface treatment can be used with heat exchange components that are also subject to vibration or pulsed fluid flow, which are mechanisms used to disrupt fouling and corrosion deposition.

In one exemplary embodiment, the surface treatment can be applied to a heat exchange component in the form of a heat exchanger tube, especially those formed as tube bundles retained in a heat exchanger housing. It is also contemplated that the surface treatment can be used in replacement tubes or in tube sheaths used to cover an inner or outer diameter of a corroded or fouled tube.

It is another aspect of the present invention to combine heat transfer components having the above described corrosion resistant materials with either a pulsation generating device or a vibrational generating device to further reduce and mitigate fouling. The devices are generically illustrated by reference numeral 3 in FIG. 1.

It is contemplated that the pulsation device will comprise any means for applying liquid pressure pulsations to the tube side liquid. In the simplest concept, the device may comprise a reciprocating pump type mechanism with a cylinder connected to the inlet/outlet conduits of the exchanger and a reciprocating piston in the cylinder to vary the internal volume of the cylinder. As the piston moves within the cylinder, the liquid will alternately be drawn into the cylinder and then expelled from it, creating pulsations in the conduit to which the device is connected. The use of a double-acting pump of this kind with one side connected to the inlet conduit and the other connected to the outlet conduit is particularly desirable since it will create the desired pressure pulsations in the tubes regardless of the pressure drop occurring in the exchanger tube bundle. Variation in the frequency of the pulsations may be afforded by variations in the reciprocation speed of the piston and any desired variations in pulsation amplitude may be provided by the use of a variable displacement pump, e.g. a variable displacement piston pump, swashplate (stationary plate) pump and its variations such as the wobble plate (rotary plate) pump or bent axis pump.

The present invention is not intended to be limited to the above-described pump; rather, it is contemplated that other types of pumps may also be used as the pulsation device including diaphragm pumps and these may be practically attractive since they offer the potential for activation of the diaphragm by electrical, pneumatic or direct mechanical means with the movement of the diaphragm controlled to provide the desired frequency and amplitude (by control of the extent of diaphragm movement). Other types may also be used but gear pumps and related types such as the helical rotor and multi screw pumps which give a relatively smooth (non pulsating) fluid flow are less preferred in view of the objective of introducing pulsations which disrupt the formation of the troublesome boundary layer. Other types which do produce flow pulsations such as the lobe pump, the vane pump and the similar radial piston pump, are normally less preferred although they may be able to produce sufficient pulsation for the desired purpose. Given the objective is to induce pulsations, other types of pulsator may be used, for example, a flow interrupter which periodically interrupts the liquid flow on the tube side. Pulsators of this type may include, for example, siren type, rotary vane pulsators in which the flow interruption is caused by the repeated opening and closing of liquid flow passages in a stator/rotor pair, each of which has radial flow openings which coincide with rotation of the moving rotor member. The rotor may suitably be given impetus by the use of vanes at an angle to the direction of liquid flow, e.g. by making radial cuts in the rotor disc and bending tabs away from the plane of the disc to form the vanes. Another type is the reed valve type with spring metal vanes which cover apertures in a disc and which are opened temporarily by the pressure of the fluid in the tube, followed by a period when the vane snaps closed until fluid pressure once more forces the vane open.

In order to optimize the impact within the heat transfer component, it is preferable to locate the pulsation device close to the exchanger in order to ensure that the pulsations are efficiently transferred to the liquid flow in the tube bundle, that is, the pulsations are not degraded by passage through intervening devices such as valves. Normally, the frequency of the liquid pulsations will be in the range of 0.1 Hz to 20 kHz. The amplitude of the pulsation as measured by the incremental flow rate through the heat exchange tubes could range from about the order of the normal heat exchanger flow rate at the lower end of the range of pulsation frequencies to less than $10^{-6}$ of the normal flow rate at the higher frequencies; because of pressure drop limitations in the heat transfer component operation and/or dissipation of higher frequencies in the fluid, the upper limit of the pulse amplitude will decrease with increased frequency. Thus, for example, in the lower half of this frequency range, the amplitude of the pulsations could be from about 10-2 to about the normal flow rate and with frequencies in the upper half of the range, from about 10-6 to 0.1 of the normal flow rate through the exchanger.

It is contemplated that the vibration producing device may be any means that is capable of imparting a vibration force on the heat exchanger unit. The vibration producing device may be of the kind disclosed in co-pending U.S. patent Ser. No. 11/436,802. The vibration producing device may be externally connected to the heat exchange unit to impart controlled vibrational energy to the tubes of the bundle. The vibration producing device can take the form of any type of mechanical device that induces tube vibration while maintaining structural integrity of the heat exchanger. Any device capable of generating sufficient dynamic force at selected frequencies would be suitable. The vibration producing device can be single device, such as an impact hammer or electromagnetic shaker, or an array of devices, such as hammers, shakers or piezoelectric stacks. An array can be spatially distributed to generate the desired dynamic signal to achieve an optimal vibrational frequency. The vibration producing device may be placed at various locations on or near the heat exchange unit as long as there is a mechanical link to the tubes. Sufficient vibration energy can be transferred to the tubes of the heat exchanger at different vibration modes. There are low and high frequency vibration modes of tubes. For low frequency modes (typically below 1000 Hz), axial excitation is more efficient at transmitting vibration energy, while at high frequency modes, transverse excitation is more efficient. The density of the vibration modes is higher at a high frequency range than at a low frequency range (typically below 1000 Hz), and vibration energy transfer efficiency is also higher in the high frequency range. Further, displacement of tube vibration is very small at high frequency (>1000 Hz) and insignificant for potential damage to the tubes.

It will be apparent to those skilled in the art that various modifications and/or variations may be made without departing from the scope of the present invention. While the present invention has been described in the context of the heat exchanger in a refinery operation. The present invention is not intended to be so limited; rather, it is contemplated that the desired surface roughness and materials disclosed herein may be used in other portions of a refinery operation where fouling may be of a concern. Reducing the surface roughness of other corrosion resistant materials such as aluminized carbon steel, titanium, electroless nickel-coated carbon steel and other corrosion resistant surfaces are extensions of this concept as delineated below. It is contemplated that the method of reducing fouling disclosed herein can be combined with other reduction strategies to reduce fouling. This includes combining the low surface roughness and/or material compositions disclosed herein with vibrational, pulsation, helical shell-side baffles and internal turbulence promoters. Thus, it is intended that the present invention covers the modifications and variations of the method herein, provided they come within the scope of the appended claims and their equivalents.

What is claimed is:

1. A method of providing sulfidation corrosion resistance and corrosion induced fouling resistance to a heat transfer component surface, the method comprising:

providing a steel surface containing at least about 5 to about 40 wt. % chromium;

forming a chromium-enriched oxide layer ($M_3O_4$ or $M_2O_3$ or mixtures thereof) on the surface of the steel, wherein M is a metal containing at least 5 wt. % Cr based on the total weight of the metal M, wherein the layer having a uniform surface roughness of less than 40 micro inches; and, forming a surface protective layer on the surface of the chromium-enriched oxide layer, comprising sulfide, oxide, oxysulfide, and mixtures thereof.

2. The method of claim 1, wherein the chromium enriched oxide layer ($M_3O_4$ or $M_2O_3$ or mixtures thereof) is formed on the surface of the steel by exposing the steel to a low oxygen partial pressure environment at a temperature of from about 300° C. to 1100° C. for a time sufficient to effect the formation of the chromium enriched oxide layer ($M_3O_4$ or $M_2O_3$ or mixtures thereof) on the surface of said steel.

3. The method of claim 2, wherein a time sufficient to effect the formation of the chromium enriched oxide layer ($M_3O_4$ or $M_2O_3$ or mixtures thereof) on the surface of the steel ranges from 1 min to 100 hrs.

4. The method of claim 2, wherein the low oxygen partial pressure environment is formed from gases selected from the group consisting $CO_2$, CO, $CH_4$, $NH_3$, $H_2O$, $H_2$, $N_2$, Ar, He and mixtures thereof.

5. The method of claim 2, wherein the low oxygen partial pressure environment is a gas mixture of $CO_2$ and CO.

6. The method of claim 2, wherein the low oxygen partial pressure environment is a gas mixture of $H_2O$ and $H_2$.

7. The method of claim 2, wherein the low oxygen partial pressure environment is pure hydrogen or argon, wherein the atmosphere of the low oxygen partial pressure environment having an dew point of less than −40° C.

8. The method of claim 2, wherein the low oxygen partial pressure environment is vacuum.

9. The method of claim 1, further comprising imparting a vibrational force to the heat transfer component surface.

10. The method of claim 1, further comprising feeding a fluid adjacent to the heat transfer component surface and imparting a pulsed force to the fluid.

* * * * *